(12) United States Patent
Gerdes et al.

(10) Patent No.: US 11,355,017 B2
(45) Date of Patent: Jun. 7, 2022

(54) ANTENNA MAST, METHOD AND INSTALLATION FOR THE PROVISION OF FLIGHT DATA AND COMPUTER PROGRAM

(71) Applicant: AlexCo Holding GmbH, Hannover (DE)

(72) Inventors: Alexander Gerdes, Hannover (DE); Alper Sevim, Hamburg OT Harvestehude (DE)

(73) Assignee: Alexco Holding GmbH, Hannover (DE)

( * ) Notice: Subject to any disclaimer, the term of this patent is extended or adjusted under 35 U.S.C. 154(b) by 254 days.

(21) Appl. No.: 16/742,376

(22) Filed: Jan. 14, 2020

(65) Prior Publication Data
US 2020/0258396 A1 Aug. 13, 2020

(30) Foreign Application Priority Data

Jan. 15, 2019 (DE) ..................... 10 2019 100 910.3
Jan. 25, 2019 (DE) ..................... 10 2019 101 886.2

(51) Int. Cl.
| | |
|---|---|
| *G08G 5/00* | (2006.01) |
| *H04W 4/42* | (2018.01) |
| *H04W 4/029* | (2018.01) |
| *H01Q 1/06* | (2006.01) |
| *H01Q 1/12* | (2006.01) |
| *H01Q 1/24* | (2006.01) |

(52) U.S. Cl.
CPC ............. *G08G 5/0013* (2013.01); *H01Q 1/06* (2013.01); *H01Q 1/1242* (2013.01); *H01Q 1/246* (2013.01); *H04W 4/029* (2018.02); *H04W 4/42* (2018.02)

(58) Field of Classification Search
CPC .... G08G 5/006; G08G 5/0082; G08G 5/0026; G08G 5/0013; H01Q 1/06; H01Q 1/1242; H01Q 1/246; H04W 4/029; H04W 4/42; H04L 67/18; Y02E 10/72; G01S 5/02; G01S 5/0294; H04B 7/18506; F03D 80/10
See application file for complete search history.

(56) References Cited

U.S. PATENT DOCUMENTS

| | | | |
|---|---|---|---|
| 2008/0136661 A1 | 6/2008 | Pederson et al. | |
| 2012/0319871 A1* | 12/2012 | Wise | ............ F21V 7/041 340/961 |
| 2014/0163857 A1 | 6/2014 | Melum et al. | |
| 2017/0127332 A1* | 5/2017 | Axmon | ............ H04W 36/0061 |

FOREIGN PATENT DOCUMENTS

| | | |
|---|---|---|
| DE | 20 2005 019 193 U1 | 4/2006 |
| EP | 1 992 963 A2 | 11/2008 |
| EP | 2 434 693 B1 | 11/2013 |

* cited by examiner

*Primary Examiner* — Joseph H Feild
*Assistant Examiner* — Sharmin Akhter
(74) *Attorney, Agent, or Firm* — WCF IP

(57) ABSTRACT

The invention relates to an antenna mast of a cellular mobile telephone network; comprising one or a plurality of mobile radio antennas to form an air interface of the mobile telephone network for mobile telephones located in the surroundings. The invention also relates to a method for the provision of flight data of aircraft, to a computer program for carrying out such a method and to a corresponding installation for the provision of flight data of aircraft.

10 Claims, 2 Drawing Sheets

Figure 1:
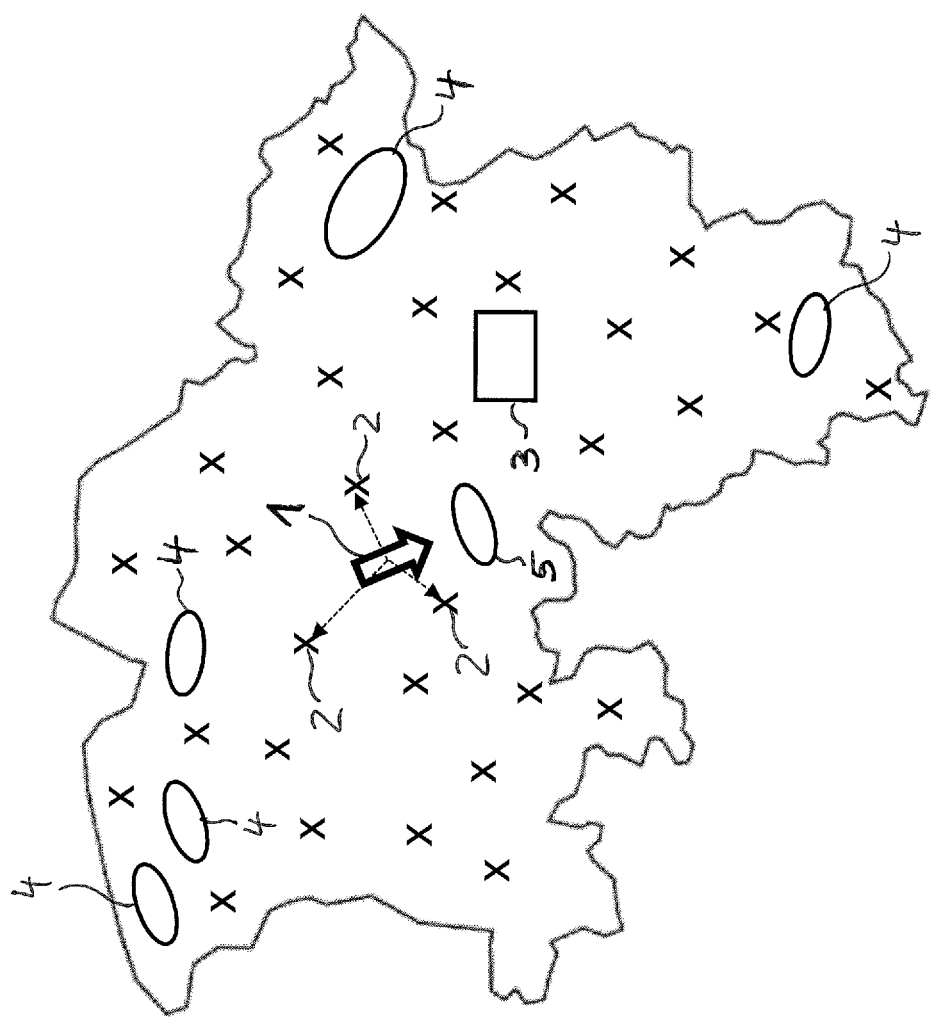

ANTENNA MAST, METHOD AND INSTALLATION FOR THE PROVISION OF FLIGHT DATA AND COMPUTER PROGRAM

The invention relates to an antenna mast of a cellular mobile telephone network, comprising one or a plurality of mobile radio antennas to form an air interface of the mobile telephone network for mobile telephones located in the surroundings. The invention also relates to a method for the provision of flight data of aircraft, to a computer program for carrying out such a method and to a corresponding installation for the provision of flight data of aircraft.

The invention relates in general to the detection of aircraft at very low flight altitude, e.g. low-flying helicopters or sports aircraft. The detection of data of such aircraft and their provision can be used, for example, for the operation of signal transmitters at aviation obstacles, for example for switching on lighting installations in a timely manner that are not operated continuously at wind energy installations. The corresponding data can, of course, also be used for other purposes, for example for the display of flight movements in a monitored region.

Proposals for performing a control of obstacle lighting employing transponder signals of aircraft are known from DE 20 2005 019 193 U1 or EP 2 432 693 B1. Since such transponder signals normally already contain altitude and location information about the aircraft, it is possible through a comparison with the geographic position of an aviation obstacle to deduce a risk of collision and accordingly a need to switch on the obstacle lighting of the aviation obstacle.

The invention is based on the object of indicating alternative and/or improved possibilities for the detection of flight movements of aircraft.

This object is achieved through an antenna mast of a cellular mobile telephone network, comprising one or a plurality of mobile radio antennas to form an air interface of the mobile telephone network for mobile telephones located in the surroundings, wherein at least one receiving device for the reception of aircraft transponder signals is arranged at the antenna mast. According to the invention it has been recognized that cellular mobile telephone networks offer an advantageous infrastructure for monitoring aviation traffic, since they already comprise a relatively dense network of antenna masts across the country which, according to the invention, only has to be extended with a receiving devices for the reception of aircraft transponder signals in order to enable a reliable monitoring of aviation traffic, in particular at very low flight altitudes. Since the necessary resources such as an electrical power supply and connection to a data network are already present in the area of such an antenna mast, the corresponding extension can be realized easily and economically. The antenna mast can, for example, already comprise a base station of a mobile telephone network.

According to an advantageous development of the invention, the receiving device comprises a receiving antenna with an at least predominantly horizontally aligned reception characteristic for receiving aircraft transponder signals. This enables a particularly efficient and far-reaching detection of low-flying aircraft. The detection of aircraft flying at high altitude is, on the other hand, unimportant for the realization of this development of the invention.

The object mentioned at the beginning is, moreover, achieved through a cellular mobile telephone network, e.g. a cellular mobile telephone network extending across the country that comprises exclusively or predominantly antenna masts of the type previously described. The advantages described previously can also be realized in this way.

In this context, a cellular mobile telephone network extending across the country is also to be understood to refer to a mobile telephone network that is designed fundamentally for operation across the country, but which can also have a network coverage of less than 100%.

According to one advantageous development of the invention, an installation for the control of aviation obstacle lighting is coupled, at least for data transfer, to the receiving device of at least one antenna mast of the type described previously, multiple receiving devices of a plurality of antenna masts of the type described previously and/or a cellular mobile telephone network of the type described previously, wherein the installation for the control of the aviation obstacle lighting is designed to control the aviation obstacle lighting on the basis of data or signals received from the receiving device or from the receiving devices. The control of the aviation obstacle lighting in particular includes switching the aviation obstacle lighting on and/or off. The installation for the control of aviation obstacle lighting can be a local installation that is assigned to a wind power installation or to a farm of wind energy installations. The installation for the control of the aviation obstacle lighting can also be an installation independent of individual wind energy installations or wind energy installation farms, for example an installation of the type explained below for the provision of flight data of aircraft. The generation of switch-on signals and/or switch-off signals for the aviation obstacle lighting can, for example, take place according to a method of the type described below.

The object mentioned at the beginning is moreover achieved by a method for the provision of flight data of aircraft with the following steps:
    a) identification data sets transmitted by aircraft are received wirelessly at multiple receiving devices that are installed at different locations, wherein an identification data set comprises at least one item of information uniquely identifying the aircraft that is transmitting the respective identification data set,
    b) at least one physical characteristic value measured in the receiving device (2), a reception time point and/or a received power of the received identification data set in particular, is assigned in the respective receiving device (2) to a received identification data set,
    c) the characteristic values originating from an aircraft are set in relationship to one another in an evaluation device in such a way that variances between the received radio signals are determined in the form of differences between the characteristic values,
    d) the current three-dimensional, geographic position of the aircraft is determined from the variances.

The three-dimensional geographic position of the aircraft can, in particular, comprise the geographic position, the geographic latitude and the flying altitude of the aircraft. In this way, through cooperative evaluation of identification data sets received at different receiving devices, the current three-dimensional geographic position of the aircraft can be reliably determined. The method according to the invention is thus in particular independent of the presence of data identifying the geographic position of the aircraft in the transponder signals of the aircraft. This has the advantage that the method according to the invention is compatible with any type of identification data sets of aircraft transmitted wirelessly, regardless of whether or not these identification data sets contain their own information about the geographic position of the aircraft. The method according to the invention is thus significantly less subject to malfunction than known solutions.

The receiving devices can, in particular, be receiving devices for the reception of aircraft transponder signals. The receiving devices can be distributed regularly or irregularly over a region to be monitored, for example in such a way that the receiving devices are each arranged at the antenna masts of a cellular mobile telephone network, as explained previously.

A physical characteristic value measured in the receiving device can, for example, be a reception time point determined by means of time measurement and/or a received power determined by means of power measurement. The received power can, for example, be obtained from an RSSI signal (RSSI—Received Signal Strength Information) that is made available by the receiving device. Reception time points and/or received powers originating from an aircraft can then, for example, be set in relation to one another in such a way that variances between the received wireless signals in the form of time differences of the reception time points and/or power differences of the received powers are determined.

The further information assigned in step b) in the respective receiving device to a received identification data set such as the reception time point, received power and/or other measured physical characteristic value can, for example, be supplied to the evaluation device in the form of a data package. The evaluation device can be designed in the form of a central evaluation device which can be spatially remote from all of the receiving devices or spatially combined with one receiving device. The evaluation device can also be constructed of a plurality of separate computer devices which are installed at one location or at different locations and networked to one another. Parts of the evaluation device can, for example, be arranged in combination with receiving devices, and other parts be arranged remotely from such receiving devices.

According to one advantageous embodiment of the invention, it is provided that the three-dimensional geographic position of the aircraft is determined from the variances through triangulation and/or trilateration. This permits a reliable, computerized determination of the three-dimensional geographic position of the aircraft. Usually, data sets from at least three mutually remote receiving devices are required for this purpose. If data sets from more than three receiving devices are available, these can be used to increase the accuracy (redundancy) of the determination of the three-dimensional geographic position of the aircraft.

According to one advantageous embodiment of the invention, it is provided that the flight direction and/or the flight speed of an aircraft is determined from a plurality of three-dimensional geographic positions determined in sequence for the aircraft. With reference to the identification data sets received at the plurality of receiving devices, additional information that enables a prediction of the three-dimensional geographic position in the future can be determined in this way. This has, in turn, the advantage that the method is even less liable to malfunction, since short data gaps in the reception can be compensated for computationally with reference to the flight direction and the flight speed.

According to one advantageous embodiment of the invention, it is provided that the evaluation device makes the three-dimensional geographic position of the aircraft available to systems for the control of aviation obstacle lighting and/or transmits switch-on and/or switch-off signals for switching the aviation obstacle lighting on or off. The evaluation device can thus either be directly involved with the control of the aviation obstacle lighting in that it makes switch-on and/or switch-off signals available. If the evaluation device only makes the three-dimensional geographic position available to other systems for the control of aviation obstacle lighting, these can autonomously perform the control of the aviation obstacle lighting (switch on/switch off) through a comparison with a known geographic position of an aviation obstacle.

According to one advantageous embodiment of the invention, it is provided that, at least at time points that are to be defined, a comparison is carried out between the three-dimensional geographic position of the aircraft determined by the evaluation device and position data that identifies the three-dimensional geographic position of the aircraft transmitted by the aircraft itself. The data calculated with the method according to the invention, i.e. the current three-dimensional geographic position and, if relevant, data such as the flight direction and/or flying speed determined therefrom, can in this way be supported with reference to the signals made available, for example, by the transponder. The security of the method according to the invention and the data integrity can be further improved hereby.

According to one advantageous embodiment of the invention, it is provided that in the event of loss of the received radio signal of an aircraft, a first minimum switch-on time for the aviation obstacle lighting is determined which is calculated with reference to the previously determined flight direction and flight speed of the aircraft. In the case of such a signal loss the period of time during which the aircraft remains in the region of the aviation obstacle is accordingly at least estimated, and through the first minimum switch-on-time it is ensured that the aviation obstacle lighting is not switched off before the aircraft has left the region of the aviation obstacle. A switching off of the aviation obstacle lighting is thus only effectuated when the first minimum switch-on time has elapsed.

According to one advantageous embodiment of the invention, it is provided that a second minimum switch-on time for the flight obstacle lighting is additionally determined independently of the flight data of the aircraft, wherein the aviation obstacle lighting is not deactivated until the first and the second minimum switch-on times have elapsed. In this way a period of time during which the flight obstacle lighting is switched on that is independent of the calculated data is specified, whereby the reliability in respect of switching the aviation obstacle lighting off too early is further increased.

The object mentioned at the beginning is furthermore achieved through a computer program with program code means configured to carry out a method of the type explained previously when the method is executed on a computer. The advantages described previously can also be realized in this way. The computer can, for example, be the computer of the evaluation device, or one or a plurality of further computers of computer installations that constitute the evaluation device.

The object mentioned at the beginning is moreover achieved by an installation for the provision of flight data of aircraft with the following features:

a) multiple receiving devices that are installed at different locations and are configured for the reception of identification data sets transmitted wirelessly from aircraft, wherein an identification data set comprises at least one item of information uniquely identifying the aircraft that is transmitting the respective identification data set, b) a respective receiving device is configured to assign at least one physical characteristic value measured in the receiving device, in particular a reception time point and/or a received power of the received identification data set, to a received identification data set, c) an evaluation device that is configured to set the characteristic values originating from an aircraft in relationship to one another in such a way that variances between the received radio signals are determined in the form of differences between the characteristic values, d) the evaluation device is configured to determine the current three-dimensional geographic position of the aircraft from the variances.

The advantages described previously can also be realized in this way. A plurality or all of the receiving devices of the installation can here be arranged at an antenna mast of a cellular mobile telephone network. A plurality or all of the receiving devices of the installation can each be designed as a receiving device for the reception of aircraft transponder signals.

The invention is described in more detail below with reference to exemplary embodiments and making use of the drawings.

Figure 2:
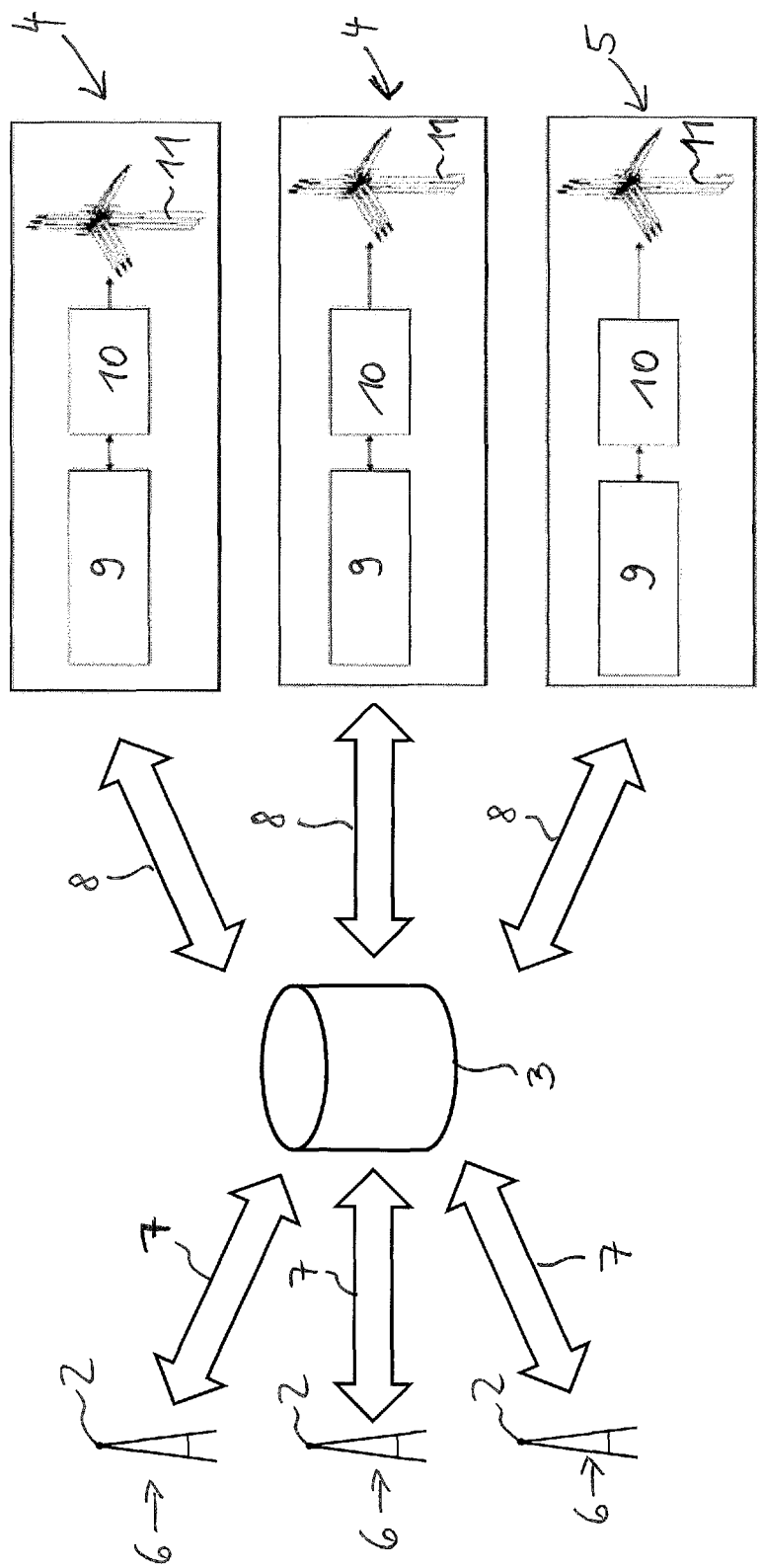

Here:

FIG. 1—shows a geographic overview of an installation according to the invention and FIG. 2—shows a schematic illustration of an installation according to the invention.

FIG. 1 shows a geographical region in which multiple receiving devices are arranged, each of which is identified with "X". Various aviation obstacles are also located in the region, illustrated by way of example in the form of wind farms 4, 5. An aircraft 1 is flying over the region. The aircraft 1 is illustrated in the form of an arrow which also indicates the direction of flight. As can be seen, the aircraft 1 is flying toward a wind farm 5.

The aircraft 1 comprises a radio transmitter, an aircraft transponder for example, by means of which identification data sets of the aircraft 1 are transmitted wirelessly. FIG. 1 shows by way of example that the identification data sets of the aircraft 1 are received at three receiving devices 2 located in the vicinity and are further processed according to the invention, meaning that a reception time point and/or a received power is assigned to a received identification data set in the respective receiving device 2. The data packages made available in this way in the receiving devices 2 are supplied to an evaluation device 3 in which the variances between the received radio signals in the form of time differences of the reception time points and/or power differences of the received powers are determined. The current three-dimensional, geographic position of the aircraft 1 is determined from the variances. The flight direction and the flight speed of the aircraft 1 can further be determined in the evaluation device 3.

In one form of embodiment of the invention, the receiving devices 2, X can make the following information available as a data package:

Reception time point T
Signal strength P
Information uniquely identifying the aircraft 1, for example a transponder identification number and/or a transponder signal number The receiving devices 2, X can additionally also make one, a plurality or all of the following information available in the data package, each of which can be read from the identification data set of the aircraft 1:

Speed of the aircraft 1
Altitude of the aircraft 1
Flight direction of the aircraft 1

The evaluation device 3 can then generate switch-on and/or switch-off signals for switching the aviation obstacle lighting on or off taking the geographic positions of the wind farms 4, 5, which are known to it, into consideration. In the example illustrated in FIG. 1 for example, the evaluation device 3 would generate switch-on signals for the aviation obstacle lighting of the wind farm 5, so that the aviation obstacle lighting is switched on there. The evaluation device 3 can, moreover, generate switch-off signals for the aviation obstacle lighting of the wind farm 5, so that the aviation obstacle lighting there is a switched off again.

FIG. 2 illustrates in particular the interaction of the individual elements of the installation and the data flows. The receiving devices 2, X are each arranged at antenna masts 6, e.g. at an antenna mast of a cellular mobile telephone network. The data packages made available by the receiving devices 2, X are transmitted to the evaluation device 3 over data connections 7. The evaluation device 3 carries out the evaluations as explained, and transmits the switch-on signals and/or switch-off signals for the aviation obstacle lighting via data connections 8 to the aviation obstacles or to the wind farm 4, 5. The data transmission via the data connections 7, 8 can be wired or wireless.

The switch-on signals and/or switch-off signals transmitted via the data connections 8 are made available in the respective wind farms 4, 5 via interface devices 9 to respective operating devices 10. The operating devices 10 serve to convert the switch-on signals and the switch-off signals into corresponding actuations of the obstacle lighting. The operating device 10 can, for example, switch the electric energy supply of a signaling device of the aviation obstacle lighting on and off.

The invention claimed is:

1. A method for the provision of flight data of aircraft, comprising:

receiving wirelessly identification data sets transmitted by aircraft at multiple receiving devices that are installed at different locations, wherein each identification data set of the identification data sets comprises at least one item of information uniquely identifying an aircraft that is transmitting the respective identification data set, measuring at least one physical characteristic value in at least one receiving device of the multiple receiving devices, assigning at least one of a reception time point and a received power of the received identification data set in the respective receiving device to a received identification data set, wherein the at least one characteristic value originating from an aircraft are set in relationship to one another in an evaluation device in such a way that variances between received radio signals are determined as variances between the characteristic values, wherein a current three-dimensional, geographic position of the aircraft is determined from the variances, and making the three-dimensional geographic position of the aircraft available to one or more systems for control of aviation obstacle lighting, wherein in an event of loss of a received radio signal of an aircraft, a first minimum switch-on time for the aviation obstacle lighting is determined which is calculated with reference to a previously determined flight direction and flight speed of the aircraft.

2. The method according to claim 1, wherein the three-dimensional geographic position of the aircraft is determined from the variances through triangulation and/or trilateration.

3. The method according to claim 1 wherein one or more of a flight direction and a flight speed of an aircraft is determined from a plurality of three-dimensional geographic positions determined in sequence for the aircraft.

4. The method according to claim 1 further comprising transmitting switch-on and/or switch-off signals for switching aviation obstacle lighting on or off.

5. The method according to claim 1, wherein at least at time points that are defined a comparison is carried out between the three-dimensional geographic position of the aircraft determined by the evaluation device and position data that identifies the three-dimensional geographic position of the aircraft transmitted by the aircraft.

6. The method according to claim 1 wherein a second minimum switch-on time for the aviation obstacle lighting is determined independently of the flight data of the aircraft, wherein the aviation obstacle lighting is not deactivated until the first and the second minimum switch-on times have elapsed.

7. A computer program encoded on a non-transient medium and contains instructions which, when executed by a computer or computer system carries out a method according to claim 1.

8. An installation for the provision of flight data of aircraft, comprising:

multiple receiving devices that are installed at different locations and are configured for the reception of identification data sets transmitted wirelessly from aircraft, wherein each identification data set of the identification sets comprises at least one item of information uniquely identifying the aircraft that is transmitting the respective identification data set, a respective receiving device is configured to assign at least one physical characteristic value measured in the receiving device selected from the group consisting of a reception time point and a received power of the received identification data set, to a received identification data set, an evaluation device configured to set characteristic values originating from an aircraft in relationship to one another in such a way that variances between received radio signals are determined in the form of variances between the characteristic values, wherein the evaluation device is configured to determine a current three-dimensional geographic position of the aircraft from the variances, and one or more systems for control of aviation obstacle lighting which are provided the three-dimensional geographic position of the aircraft, wherein said one or more systems are configured such that in an event of loss of a received radio signal of an aircraft, a first minimum switch-on time for the aviation obstacle lighting is determined which is calculated with reference to a previously determined flight direction and flight speed of the aircraft.

9. The installation according to claim 8, wherein a plurality or all of the receiving devices of the installation are arranged at an antenna mast of a cellular mobile telephone network.

10. The installation according to claim 8 wherein a plurality or all of the receiving devices of the installation are configured as a receiving device for the reception of aircraft transponder signals.

* * * * *